United States Patent
MacInnis

(10) Patent No.: US 8,401,084 B2
(45) Date of Patent: Mar. 19, 2013

(54) SYSTEM AND METHOD FOR MULTI-ROW DECODING OF VIDEO WITH DEPENDENT ROWS

(75) Inventor: Alexander MacInnis, Los Altos, CA (US)

(73) Assignee: Broadcom Corporation, Irvine, CA (US)

( * ) Notice: Subject to any disclaimer, the term of this patent is extended or adjusted under 35 U.S.C. 154(b) by 1044 days.

(21) Appl. No.: 10/141,569

(22) Filed: May 8, 2002

(65) Prior Publication Data

US 2003/0189982 A1    Oct. 9, 2003

Related U.S. Application Data

(63) Continuation-in-part of application No. 10/114,679, filed on Apr. 1, 2002, now Pat. No. 7,034,897.

(60) Provisional application No. 60/370,716, filed on Apr. 8, 2002.

(51) Int. Cl.
    *H04N 7/18* (2006.01)
(52) U.S. Cl. .............. 375/240.25; 375/240.26
(58) Field of Classification Search .......... 375/240.01–240.29; 348/711–722
    See application file for complete search history.

(56) References Cited

U.S. PATENT DOCUMENTS

| | | | | |
|---|---|---|---|---|
| 5,267,334 A * | 11/1993 | Normille et al. | ............. | 382/236 |
| 5,379,356 A * | 1/1995 | Purcell et al. | ............. | 382/233 |
| 5,428,403 A * | 6/1995 | Andrew et al. | ............. | 348/699 |
| 5,502,512 A * | 3/1996 | Toyoda et al. | ............. | 348/706 |
| 5,532,744 A * | 7/1996 | Akiwumi-Assani et al. | ............. | 348/390.1 |
| 5,576,765 A | 11/1996 | Cheney et al. | | |
| 5,579,052 A | 11/1996 | Artieri | | |
| 5,589,885 A | 12/1996 | Ooi | | |
| 5,598,483 A | 1/1997 | Purcell et al. | | |
| 5,646,687 A * | 7/1997 | Botsford et al. | ............. | 375/240.12 |
| 5,675,387 A * | 10/1997 | Hoogenboom et al. | . | 375/240.15 |
| 5,696,985 A * | 12/1997 | Crump et al. | ............. | 712/36 |
| 5,774,676 A | 6/1998 | Stearns et al. | | |
| 5,815,646 A * | 9/1998 | Purcell et al. | ............. | 345/502 |
| 5,818,432 A | 10/1998 | Tsutsumi et al. | | |
| 5,818,532 A | 10/1998 | Malladi et al. | | |
| 6,104,751 A * | 8/2000 | Artieri | ............. | 375/240.14 |
| 6,124,866 A * | 9/2000 | Asano et al. | ............. | 345/505 |
| 6,310,921 B1 * | 10/2001 | Yoshioka et al. | ............. | 375/240.26 |
| 6,538,656 B1 | 3/2003 | Cheung et al. | | |
| 6,630,964 B2 | 10/2003 | Burns et al. | | |
| 7,003,035 B2 * | 2/2006 | Tourapis et al. | ............. | 375/240.12 |
| 7,034,897 B2 | 4/2006 | Alvarez et al. | | |
| 8,005,147 B2 | 8/2011 | Alvarez et al. | | |
| 2003/0185298 A1 | 10/2003 | Alvarez et al. | | |
| 2006/0193383 A1 | 8/2006 | Alvarez et al. | | |

OTHER PUBLICATIONS

Dwivedi B K et al: "Exploring design space of parallel realizations: MPEG-2 decoder case study," Proceedings of the 9th International Workshop on Hardware/Software Codesign. Codes 2001. Copenhagen, Denmark, Apr. 25-27, 2001, New York, NY: ACM, US, Apr. 25, 2001, pp. 92-97, XP010543423 ISBN: 978-1-58113-364-6.

(Continued)

*Primary Examiner* — Andy Rao
(74) *Attorney, Agent, or Firm* — Thomas|Horstemeyer, LLP.

(57) ABSTRACT

A system and method for decoding digital video by processing multiple regions of an image in parallel, even when there are dependencies between rows in the image, are disclosed. The method generally involves decoding multiple rows concurrently, with the start of decoding of a given row being delayed until portions of the other rows on which the given row depends have been decoded. The system generally comprises parallel processors, with one processor typically decoding one row and another processor typically decoding the row above it. In accordance with the present invention, however, any number or type of processors can decode, or perform decoding functions on, the image in parallel.

28 Claims, 3 Drawing Sheets

OTHER PUBLICATIONS

Nelson H C Yung et al: "Spatial and Temporal Data Parallelization of the H.261 Video Coding Algorithm," IEEE Transactions on Circuits and Systems for Video Techology, IEEE Service Center, Piscataway, NJ, US, vol. 11, No. 1, Jan. 1, 2001, XP011014155 ISSN: 1051-8215.
EPO Communication dated Jun. 7, 2010.
Pirsch et al.: "VLSI Architectures for Video Compression—A Survey", Proceedings of the IEEE, IEEE, New York, NY, USA, vol. 83 No. 2, Feb. 1, 1995, pp. 220-246, XP000501242, ISBN: 0018-9219.
U.S. Appl. No. 09/437,208 entitlted "Graphics Display System", filed Nov. 9, 1999, Inventor: Alexander G. MacInnis et al.
U.S. Appl. No. 09/641,374 entitled "Video, Audio and Graphics Decode, Composite and Display System", filed Aug. 18, 2000, Inventor: Alexander G. MacInnis et al.
U.S. Appl. No. 09/641,936 entitled "Video and Graphics System With an MPEG Video Decoder for Concurrent Multi-Row Decoding", filed Aug. 18, 2000, Inventor: Ramanujan K. Valmiki et al.
U.S. Appl. No. 09/643,223 entitled "Video and Graphics System With MPEG Specific Data Transfer Commands", filed Aug. 18, 2000, Inventor: Ramanujan K. Valmiki et al.
U.S. Appl. No. 09/640,670 entitled "Video and Graphics System With Video Scaling", filed Aug. 18, 2000, Inventor: Alexander G. MacInnis et al.
U.S. Appl. No. 09/641,930 entitled "Video and Graphics System With a Video Transport Processor", filed Aug. 18, 2000, Inventor: Ramanujan K. Valmiki et al.
U.S. Appl. No. 09/641,935 entitled "Video and Graphics System With Parallel Processing of Graphics Windows", filed Aug. 18, 2000, Inventor: Alexander G. MacInnis et al.
U.S. Appl. No. 09/642,510 entitled "Video and Graphics System With a Single-Port RAM", filed Aug. 18, 2000, Inventor: Xiaodong Xie.
U.S. Appl. No. 09/642,458 entitled "Video and Graphics System With an Integrated System Bridge Controller", Inventor: Alexander G. MacInnis et al.

* cited by examiner

SYSTEM AND METHOD FOR MULTI-ROW DECODING OF VIDEO WITH DEPENDENT ROWS

CROSS-REFERENCE TO RELATED APPLICATIONS

This application makes reference to, and claims priority to and the benefit of, U.S. provisional application Ser. No. 60/370,716 filed Apr. 8, 2002. This application is a continuation-in-part of U.S. application Ser. No. 10/114,679, filed Apr. 1, 2002.

INCORPORATION BY REFERENCE

The above-referenced U.S. provisional application Ser. No. 60/370,716 is hereby incorporated herein by reference in its entirety.

FIELD OF THE INVENTION

The present invention relates generally to video decoding systems, and more particularly to an improved video decoding system and method that supports processing of multiple regions of an image in parallel, even when there are interdependencies between rows of the image.

BACKGROUND OF THE INVENTION

There are many major challenges in the field of digital video decompression. The design of decompression engines, referred to here as decoders, becomes more difficult as the compression formats and algorithms become more complex, and as the size or resolution of the images increases and as the bit rates increase. Traditionally, video decoders decode the compressed bit stream sequentially, in the order that the data is received, without parallel processing of multiple rows. For some video formats, picture sizes and bit rates, this traditional method may require extremely high levels of performance that may be either impractical or very expensive.

Some existing video decoders improve performance by decoding multiple rows of video in parallel, using parallel processors. In other words, multiple rows are decoded in parallel, with the start of decoding of each row being as early as the bit stream and a decode processor are available, and proceeding at whatever rate the processor delivers. A row is a set of macroblocks, typically 16×16 pixels each, which span the image from left to right, with a height of one macroblock. Some existing MPEG-2 HD (high definition) MPEG decoders decode 2 rows in parallel. This is possible because of a few attributes of the MPEG-2 video bit stream format, notably (a) each row has a start code that the decoder can find without necessarily decoding the row before or above it, and (b) each row can be decoded independently of the other rows in the same picture.

Some newer video compression formats, such as the Joint Video Team (JVT) project of ISO-MPEG and ITU-VCEG, provide much better compression than MPEG-2, in terms of compressed bit rate for a given level of quality. This makes them attractive for commercial deployment. However, they are also much more complex to encode and decode than MPEG-2. There is a desire to have a practical, low cost decoder that can decode JVT video at HD resolutions and bit rates. Since JVT is much more complex to decode than MPEG-2, the motivation to find a way to implement a decoder with parallel operations is even greater than that for MPEG-2.

However, JVT video does not have the second property of MPEG-2 video listed above; that is, each row cannot be decoded independently of the other rows in the picture. On the contrary, each row typically depends upon the results of decoding some portions of other rows in the same picture. This makes it difficult to design a decoder that can decode more than one row in parallel. Some experts believe it is impossible to decode multiple portions of a picture concurrently using the JVT format, due to the interdependency between rows.

Further limitations and disadvantages of conventional and traditional approaches will become apparent to one of skill in the art, through comparison of such systems with the present invention as set forth in the remainder of the present application with reference to the drawings.

SUMMARY OF THE INVENTION

Aspects of the present invention may be found in a system for decoding, in parallel, more than one row of video data. The system may comprise two or more processors that perform an identical decoding function, each on macroblocks in respective rows of input video data. In one embodiment, the decoding function comprises a complete decoding of macroblocks, while in another embodiment, the decoding function comprises entropy decoding, for example.

Each of the processors waits to perform the decoding function on a given macroblock in its respective row until one or more other processors, working on one or more other rows, has completed performance of the decoding functions on which the given macroblock depends on all predecessor macroblocks for the given macroblock. In some cases, a processor also waits to perform the decoding function on the given macroblock until it has performed the decoding function on a further predecessor macroblock for the given macroblock that is located in its respective row.

Further aspects of the present invention may be found in a method where a macroblock is received; a determination is made that a decoding function has been completed with respect to each of one or more predecessor macroblocks for the received macroblock; and the decoding function is then performed on the received macroblock in response to the determination.

Additional aspects of the present invention may be found in another method, where a macroblock is received, and a decoding function is performed on the received macroblock only after decoding functions on which the decoding function depends has been completed on each of one or more predecessor macroblocks for the received macroblock.

Each of these methods may also involve the identification of the predecessor macroblocks.

These and other advantages, aspects and novel features of the present invention, as well as details of an illustrated embodiment thereof, will be more fully understood from the following description and drawings.

DETAILED DESCRIPTION OF THE INVENTION

The following description is made with reference to the appended figures.

Figure 1:
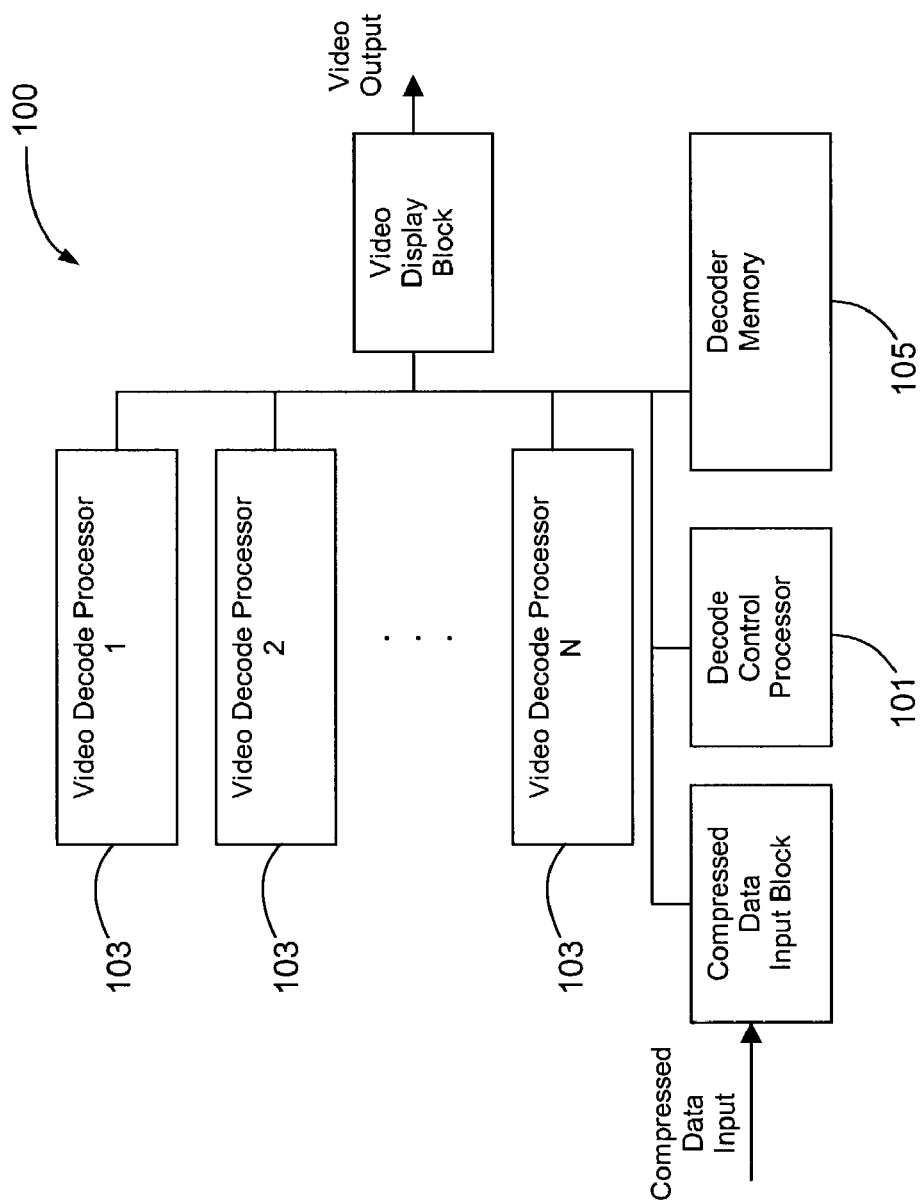
FIG. 1 depicts one illustrative embodiment of a generic video decoding system that may be used in connection with the present invention.

FIG. 1 depicts one illustrative embodiment of a generic video decoding system that may be used in connection with the present invention. Video decoding system 100 generally comprises a plurality of processors that may perform decoding operations in parallel on more than one row of compressed video data.

Specifically, the video decoding system 100 generally comprises a decode control processor 101 and two or more video decode processors 103. The decode control processor 101 may be a considered a central control unit of the decoding system 100, that manages decoding operations in the system, including the video decode processors 103. The decode control processor 101 may be a RISC processor, for example, and may prepare input video data for decoding, may fetch required data from decoder memory 105, and may itself perform some data processing on the input video data.

In one embodiment, each of the video decode processors 103 is capable of decoding, on its own, macroblocks of video data, under the control of the decode control processor 101. Thus, in this embodiment, the video decode processors 103 operate in parallel, each on a separate row of input video data, for example.

In another embodiment, instead of being capable of decoding macroblocks of data entirely on their own, the video decode processors 103 may be any module, engine or accelerator, for example, that performs a decoding function on a macroblock of video data. Such functions may include, for example, entropy decoding, deblocking, inverse transform functionality, inverse quantization, motion compensation, etc. In other words, the video decode processors 103 may be any module, engine or accelerator that could assist the decode control processor 101 by off-loading decoding tasks that may otherwise be a bottleneck in real-time video decoding systems if handled by the decode control processor 101 alone.

In this latter embodiment, two or more of the video decode processors 103 perform critical functions, such as entropy decoding, for example. These critical processors perform the same decoding function in parallel on two or more rows of video data. Each of the remainder of the processors 103 (i.e., those that are not duplicated) performs another decoding function, such as mentioned above, also on two or more rows of video data, but sequentially—first on a macroblock of one row and then on a macroblock on another row, and so on.

Additional detail regarding an implementation of this latter embodiment of the video decoding system of FIG. 1, capable of performing dual row decoding, for example, may be found in U.S. application Ser. No. 10/114,679 entitled "Method Of Operating A Video Decoding System" filed Apr. 1, 2002, which application is incorporated herein by reference in its entirety.

While specific decoding systems are discussed above, however, it should be understood that any type of system that performs decoding operations in parallel on more than one row of compressed video data may benefit from, and falls within the scope of, the present invention.

Figure 2:
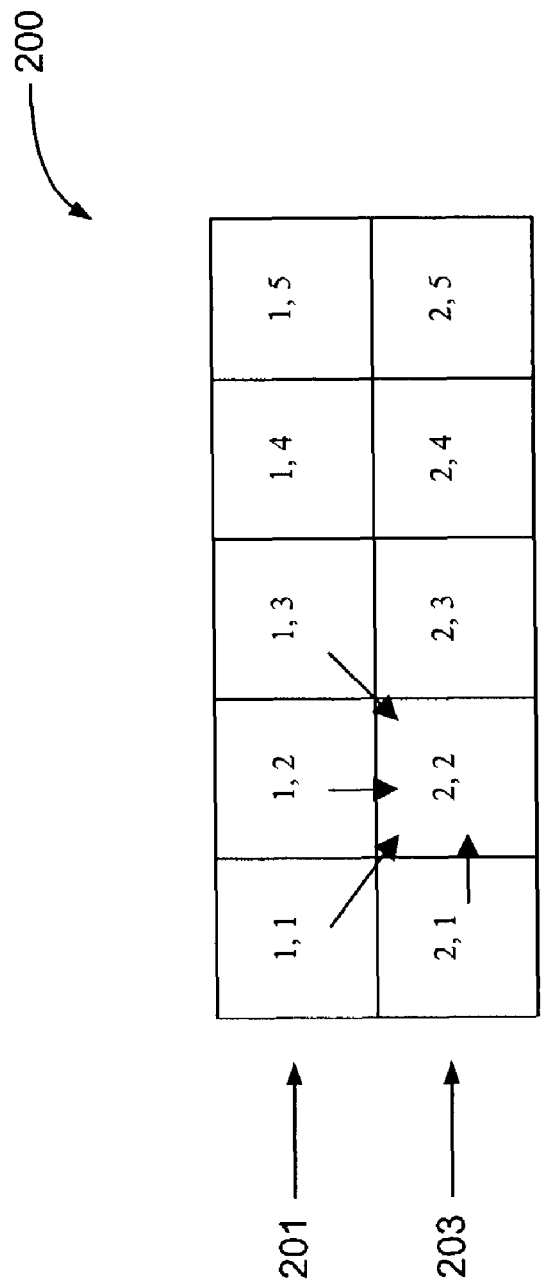
FIG. 2 depicts a representative sample of 5 macroblocks from each of 2 rows of video data, for illustrating exemplary aspects of the present invention.

FIG. 2 depicts a representative sample 200 of 5 macroblocks from each of 2 rows 201 and 203 of video data, for illustrating exemplary aspects of the present invention. For purposes of this example, macroblocks are indicated by the letter B. The numbers in each box (m, n) refer to row (m) and horizontal position (n) of each macroblock. In the example in FIG. 2, B(2,2) is dependent on B(1,1), B(1,2), B(1,3), and B(2,1). These dependencies are indicated by arrows. In this context, dependency means that a macroblock cannot be decoded properly until the macroblocks on which it depends have been decoded. The macroblocks on which a given macroblock depends are called its predecessors. The dependency is an artifact of the video stream being decoded, not of the decoder design.

In the example of FIG. 2, the decoding of B(2,2) does not begin until the decoding of its predecessors B(1,1), B(1,2), B(1.3), and B(2,1) is complete. Once these conditions are met, the decoding of B(2,2) can proceed, while the decoding of B(1,4), B(1,5), etc. may proceed in parallel. In other embodiments using pipelined decoding processes, the decoding of B(2,2) could start before the decoding of the predecessor macroblocks is complete, however each stage in the decoding pipeline does not begin until the decoding stages on which it depends are completed in the predecessor macroblocks. In general, the terms "decoding" may refer to either pipelined or non-pipelined decoding systems, and "complete" or "decoded" refers to either finishing decoding of a macroblock, or finishing decoding of those pipeline stages of a macroblock on which each pipeline stage of the current macroblock depends.

Assuming B(2,1) depends only on B(1,1) and B(1,2), which is typical if B(2,1) is the first macroblock in the row, the decoding of B(2,1) can begin as soon as B(1,1) and B(1,2) are decoded.

In typical operation, decoding begins with the first row. Typically, the first row does not depend on any other row in the picture, that is, it has no predecessors in the same picture, so decoding of the first row can start as soon as its dependencies are met, including the availability of the bit stream to be decoded, the availability of a decoding processor to perform the task, and other pictures upon which decoding of this picture depend have been decoded. Decoding of the first row may proceed at any rate of which the processor is capable; it does not need to wait for any other processing to be completed.

Once the predecessors of B(2,1), the first macroblock of the second row, have been decoded, a second processor can begin decoding the second row. Decoding of successive macroblocks in the second row is paced by the completion of the predecessor macroblocks for each of the macroblocks in the second row. In general, the second row can be decoded at the same rate as the first row, only the start of decoding is delayed. In the example of FIG. 2, decoding the second row is delayed by 2 macroblocks with respect to the first row. If the video format had a different set of predecessors, the delay might be different.

Additional rows can be decoded in parallel if desired. A third row can be decoded in parallel, again with the start of decoding of the row waiting until the predecessors of its first macroblock have been decoded. Again, the decoding of each successive macroblock is paced by the completion of the respective predecessors of each macroblock. Using the same stream characteristics illustrated in FIG. 2, decoding of the third row is typically delayed by 2 macroblocks with respect to the second row. The same applies to a fourth or additional rows.

The processors (e.g., video decode processors 103 of FIG. 1) can communicate about the completion of predecessor macroblocks in a number of ways. In one illustrative embodiment, each processor has a register indicating the number of the macroblock most recently decoded, and this register is read by the other processors. In another embodiment using a pipelined decoding system, each processor has a register indicating the number of the macroblock most recently decoded and the pipeline stage most recently completed of the macroblock most recently started. As such, the other processors can readily determine when predecessor macroblocks or selected stages of them are complete. In another embodiment, each processor writes the number of the most recently complete macroblock to a location in memory (e.g., decoder memory 105 of FIG. 1) shared by a control processor (e.g., decode control processor 101 of FIG. 1) that controls all decoding operations. In another embodiment, each processor also writes the pipeline stage most recently completed of the macroblock most recently started. Of course, many other implementations are also contemplated and fall within the scope of the present invention.

Figure 3:
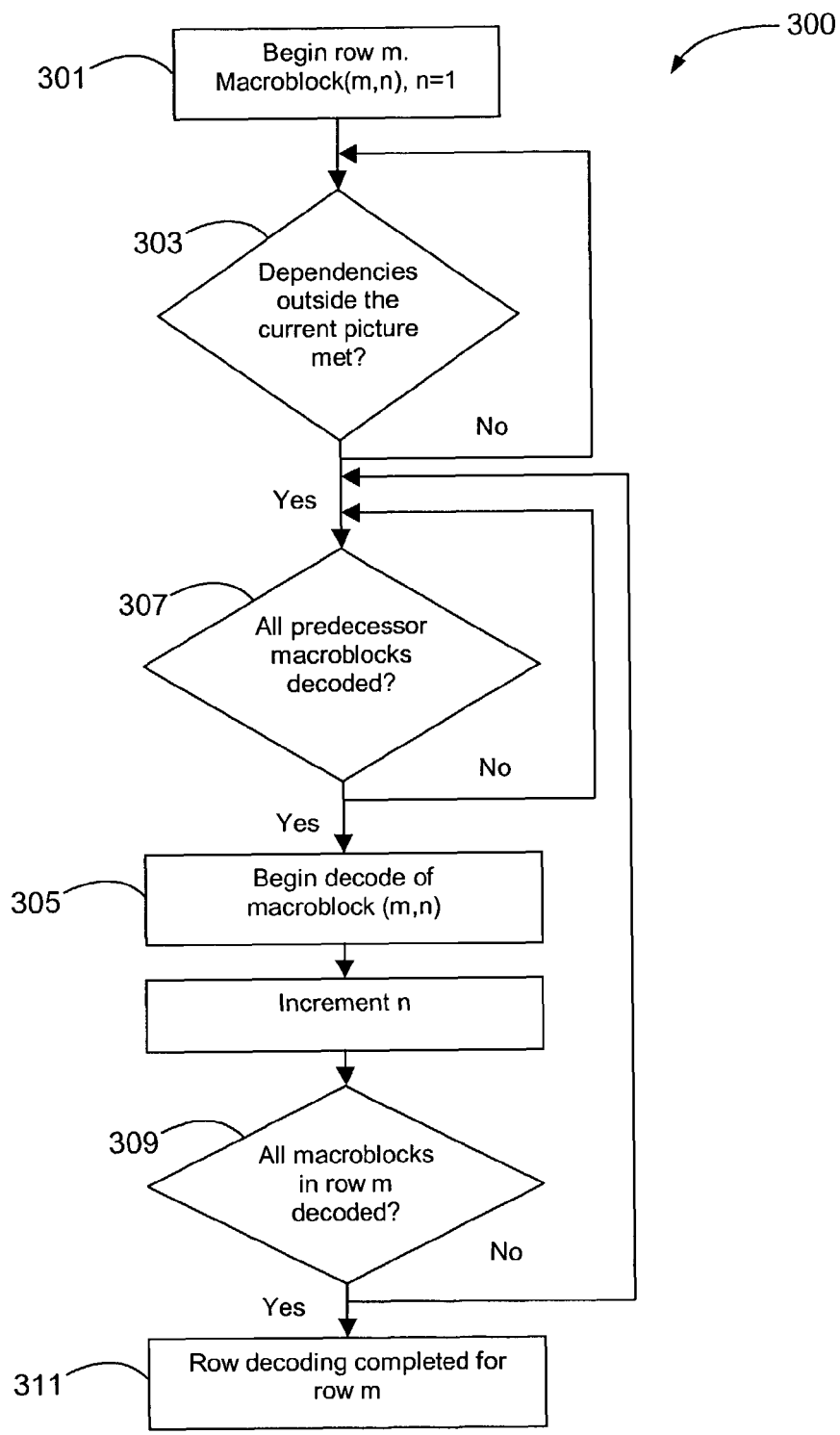
FIG. 3 is a flow diagram of a method that may be performed by a decoding system that has two or more processors that are capable of decoding video in parallel, in accordance with one embodiment of the present invention.

FIG. 3 is a flow diagram of a method that may be performed by a decoding system that has two or more processors capable of decoding video in parallel, in accordance with one embodiment of the present invention. Method 300 illustrated in FIG. 3 operates generally as follows. In an illustrative embodiment, as discussed above, a core processor (e.g., decode control processor 101 of FIG. 1) controls the operation of parallel decode processors (e.g., video decode processors 103 of FIG. 1). The core processor selects a row for each of one or more of the decode processors to decode (see reference numeral 301 of FIG. 3). The method of selection of rows to decode typically depends on the details of the video format. For example, MPEG-2 video includes slice start codes, with a unique start code prefix, every row. As in prior art methods of parallel multi-row decoding, an element in the video decoder, such as the core processor or a stream pre-processor, can identify the locations of all rows before they are decoded. Other formats, including those that have inter-row dependencies, may have similar start codes, or other methods such as a network adaptation layer that packages rows or slices in network packets, or syntax indicating the length of each slice or row. It should be understood that the use of the term "row" herein is intended to generically cover both the term row as well as the term slice.

Referring again to FIG. 3, the start of decoding of each picture does not begin until the dependencies of that picture are met (see reference numeral 303). Typical dependencies of a picture include the decoding of previous pictures, and the availability of the compressed data to be decoded.

The start of decoding of each macroblock (see reference numeral 305), starting with the first macroblock in each row, does not begin until its predecessor macroblocks have been decoded (see reference numeral 307). Which of the macroblocks are predecessors is a function of the video data format. An example is illustrated in FIG. 2. The set of dependencies may vary from picture to picture in a given video stream. Once decoding of one macroblock has begun, the decoding of the next macroblock may begin if all of its predecessors have been decoded. In some embodiments the decoding of a macroblock may be pipelined, such that the one macroblock may not be fully decoded before the next macroblock is started. In such embodiments, each stage of decoding may begin as soon as all its dependencies have been met; dependencies typically include among other things the completion of those pipeline stages of predecessor macroblocks on which the current pipeline stage depends. Decoding of a macroblock may be delayed until the previous macroblock has been completed, depending on the dependencies of the macroblock as specified by the video format.

The process continues as long as desired. In a typical embodiment such as shown in FIG. 3, this process continues until the decoding of a row has been completed (see reference numerals 309 and 311). In other embodiments, one decode processor could decode less than a row; for example another processor could decode another part of the same row in parallel. In another embodiment, the process continues beyond the end of one row. For example one decode processor could decode multiple rows sequentially, while another decode processor could decode a different set of rows.

Aspects of the present invention therefore allow the construction of practical decoders of digital video, where the format of the video involves dependencies between rows, and where the computational complexity of the decoding algorithm is very high, such that a purely sequential decoding method may not be practical or cost-effective.

Many modifications and variations of the present invention are possible in light of the above teachings. Thus, it is to be understood that, within the scope of the appended claims, the invention may be practiced otherwise than as described hereinabove.

The invention claimed is:

1. A system for decoding, in parallel, more than one row of video data of a picture comprising:
    a first processor that performs a decoding function on macroblocks of a first row of video data of the picture, wherein each row of the picture cannot be decoded independently of other rows in the same picture; and
    a second processor that performs the decoding function on macroblocks of a second row of video data of the same picture;
    wherein the second processor begins performing the decoding function on a macroblock of the second row only after decoding a plurality of predecessor macroblocks of the first row upon which decoding of the macroblock of the second row individually depends.

2. The system of claim 1 wherein the decoding function comprises one of a complete decoding of a macroblock or a performance of one or more stages of a decoding pipeline.

3. The system of claim 1 wherein the decoding function comprises entropy decoding.

4. The system of claim 1 wherein a third processor performs the decoding function on a second macroblock of the second row at the same time as the second processor performs the decoding function on the first macroblock of the second row.

5. The system of claim 1 wherein the second row includes a particular macroblock that has no predecessors, wherein the second processor begins performing the decoding function on the particular macroblock of the second row after the second processor begins to perform, but before the second processor completes, the decoding function of the first macroblock of the second row.

6. The system of claim 1 wherein the second processor begins performing the decoding function on the macroblock of the second row only after decoding at least one predecessor macroblock of the second row and the plurality of predecessor macroblocks of the first row upon which decoding of the macroblock of the second row individually depends.

7. A system for decoding, in parallel, more than one row of video data of a picture comprising:
    a first processor that at least begins to decode a first predecessor macroblock and a second predecessor macroblock in a first row of video data of the picture, wherein each row of the picture cannot be decoded independently of the other rows in the same picture;
    a second processor that begins to decode a particular macroblock in a second row of video data of the same picture once the second processor begins to decode a predecessor macroblock in the second row upon which the particular macroblock depends and once the first processor begins to decode the first predecessor macroblock and the second predecessor macroblock in the first row of the same picture upon which the particular macroblock depends and a third processor that manages decoding operations in the system and that selects rows of the video data to be assigned to the first processor and the second processor based on details of video format of the video data.

8. The system of claim 7 wherein the first processor performs multiple stages of a decoding pipeline.

9. The system of claim 7 wherein once the second processor begins to decode, but before the second processor finishes decoding, the particular macroblock of the second row, the second processor begins to decode another macroblock in the second row of the same picture if predecessor macroblocks upon which the other macroblock depends have at least begun to be decoded.

10. The system of claim 7 wherein the third processor assigns the second row to the second processor and a fourth processor, wherein the second processor decodes a first portion of the second row of the same picture, and wherein the fourth processor concurrently decodes a second portion of the second row of the same picture.

11. A system for decoding, in parallel, more than one row of video data of a picture comprising: a plurality of processors, each of the plurality of processors performing an identical and complete decoding function on macroblocks of different respective rows of input video data of the same picture, wherein each row of the picture cannot be decoded independently of the other rows in the same picture, wherein each of the plurality of processors waits to perform the decoding function on a given macroblock in its respective row until at least one other of the plurality of processors has at least begun performance of the decoding function on all predecessor macroblocks in the respective row and a different row of the same picture upon which the given macroblock depends, wherein which macroblocks are predecessor macroblocks is a function of video data format, and wherein, once decoding of the given macroblock in its respective row by a corresponding processor has begun but has not been completed, the corresponding processor begins decoding a second macroblock in the respective row if all of predecessor macroblocks of the second macroblock have begun to be decoded.

12. The system of claim 11 comprising a decoder controller that manages the plurality of processors and selects which row or rows are assigned to which processors for decoding based on details of the video data format.

13. The system of claim 11 wherein each processor has a register that indicates a number of the macroblock most recently decoded and that indicates which pipeline stage was most recently completed for the macroblock that is most recently started.

14. The system of claim 11 wherein each of the plurality of processors determines when relevant predecessor macroblocks are decoded by reading one or more registers of other of the plurality of processors that decoded the relevant predecessor macroblocks.

15. A method of decoding, in parallel, more than one row of video data of a picture in a video decoding device, comprising:

receiving a particular macroblock at a first of a plurality of video decode processors that are configured to decode macroblocks in parallel;

determining, by a decode control processor that controls each of the plurality of video decode processors, whether a decoding function has been completed by the first video decode processor and at least a second of the plurality of video decode processors with respect to each of a plurality of predecessor macroblocks for the particular macroblock, wherein the particular macroblock and at least one predecessor macroblock are in one of the picture, and at least one other predecessor macroblock is in a different row of the same picture, wherein each row of the picture cannot be decoded independently of the other rows in the same picture; and performing, by the first video decode processor, the decoding function on the particular macroblock in response to the determining.

16. The method of claim 15 further comprising identifying, by the decode control processor, the plurality of predecessor macroblocks.

17. The method of claim 15 wherein the decoding function comprises one of a complete decoding of a macroblock or a performance of one or more stages of a decoding pipeline.

18. The method of claim 15 wherein the decode control processor assigns a different row in the same picture to a different video decode processor based on details of a video format of the video data, and wherein each row of the same picture is decoded by a respective video decode processor in parallel with other rows and at a same rate as other rows, but each row has a different delay before starting the decoding of the respective row.

19. A method of decoding, in parallel, more than one row of video data of a picture in a video decoding device, comprising:

assigning different rows of the same picture by a decoder controller to different video decode processors based on a video format of the video data, wherein the video decode processors are configured to decode macroblocks in parallel;

receiving a particular macroblock at one of the video decode processors;

completing the performance of a decoding function on each of a plurality of predecessor macroblocks for the particular macroblock, by the one video decode processor and at least of the video decode processors, wherein the particular macroblock and at least one predecessor macroblock are in a same row of the same picture and at least one other predecessor macroblock is in a different row of the same picture; and performing, by the one video decode processor, the decoding function on the particular macroblock after completion of the decoding function on the at least one predecessor macroblock in the same row and the at least one other predecessor macroblock in the different row of the same picture upon which the particular macroblock depends.

20. The method of claim 19 further comprising identifying, by a decode control processor that controls each of the plurality of video decode processors, the plurality of predecessor macroblocks.

21. The method of claim 19 wherein the decoding function comprises one of a complete decoding of a macroblock or a performance of one or more stages of a decoding pipeline.

22. The method of claim 19 wherein which macroblocks are predecessor macroblocks is a function of video format of the video data.

23. A method of decoding, in parallel, more than one row of video data of a picture in a video decoding device, comprising:

receiving, by a first processor, a particular macroblock in a first row;

performing, by a second processor and the first processor, a decoding function on a plurality of predecessor macroblocks for the particular macroblock, wherein the particular macroblock and at least one predecessor macroblock are in a same row of the same picture, and at least one other predecessor macroblock is in a different row of the same picture;

indicating, by the second processor to the first processor, that the decoding function performed on the at least one other predecessor macroblock in the different row has been completed;

performing, by the first processor, the decoding function on the particular macroblock after the indication that the decoding function has been performed the first processor decodes the at least one predecessor macroblock in the same row.

24. The method of claim 23 further comprising identifying the plurality of predecessor macroblocks.

25. The method of claim 23 wherein the decoding function comprises one of a complete decoding of a macroblock or a performance of one or more stages of a decoding pipeline.

26. The method of claim 23 wherein the first processor and the second processor perform identical decoding functions at the same rate.

27. The method of claim 23 wherein the first processor obtains the indication by reading a register of the second processor.

28. The method of claim 23 wherein the second processor provides the indication by writing information regarding completion to a memory, and wherein a third processor accesses the memory and communicates completion information to the first processor.

* * * * *